US012293378B2

United States Patent
Vadori et al.

(10) Patent No.: US 12,293,378 B2
(45) Date of Patent: May 6, 2025

(54) METHOD AND SYSTEM FOR SIMULATION AND CALIBRATION OF MARKETS

(71) Applicant: JPMorgan Chase Bank, N.A., New York, NY (US)

(72) Inventors: Nelson Vadori, New York, NY (US); Sumitra Ganesh, Short Hills, NJ (US); Mengda Xu, Jersey City, NJ (US); Prashant P Reddy, Madison, NJ (US); Maria Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 188 days.

(21) Appl. No.: 17/451,720

(22) Filed: Oct. 21, 2021

(65) Prior Publication Data
US 2022/0129925 A1 Apr. 28, 2022

Related U.S. Application Data

(60) Provisional application No. 63/104,161, filed on Oct. 22, 2020.

(51) Int. Cl.
*G06Q 30/02* (2023.01)
*G06N 20/00* (2019.01)
(Continued)

(52) U.S. Cl.
CPC ......... *G06Q 30/0202* (2013.01); *G06N 20/00* (2019.01); *G06Q 10/067* (2013.01)

(58) Field of Classification Search
CPC ... G06Q 30/0202; G06Q 10/067; G06N 20/00
See application file for complete search history.

(56) References Cited

U.S. PATENT DOCUMENTS

| 11,055,861 B2 * | 7/2021 | Nazari | G06F 11/203 |
| 2011/0119201 A1 * | 5/2011 | Zimmerman, Jr. | G06Q 10/067 |
| | | | 705/348 |

(Continued)

FOREIGN PATENT DOCUMENTS

| CA | 3044781 A1 * | 11/2019 | G06N 3/006 |
| EP | 3567539 A1 * | 11/2019 | G06N 3/0445 |

OTHER PUBLICATIONS

Jia Wu, Chen Wa, Xiong L, Hongyong Su. Quantitative trading on stock market based on deep reinforcement learning. In2019 International Joint Conference on Neural Networks (IJCNN) Jul. 14, 2019 (pp. 1-8). IEEE. (hereinafter Wu). (Year: 2019).*

(Continued)

*Primary Examiner* — Hamzeh Obaid
(74) *Attorney, Agent, or Firm* — GREENBLUM & BERNSTEIN, P.L.C.

(57) ABSTRACT

A method for creating a realistic agent-based simulation of an over-the-counter market and using data from the real market to calibrate the simulator is provided. The method includes: assigning, to each of a group of agents, a type value that relates to a state of the respective agent; receiving agent-specific data that relates to market-based observations, market-based actions, and market-based rewards; generating a market simulation based on the assigned type values and the received agent-specific data; and calibrating the market simulation based on actual market data.

15 Claims, 4 Drawing Sheets

(51) Int. Cl.
  *G06Q 10/067* (2023.01)
  *G06Q 30/0202* (2023.01)

(56) References Cited

U.S. PATENT DOCUMENTS

| | | | | |
|---|---|---|---|---|
| 2015/0066592 A1* | 3/2015 | Ehm | .................. | G06Q 30/0202 705/7.31 |
| 2015/0262205 A1* | 9/2015 | Theocharous | ..... | G06Q 30/0202 705/7.31 |
| 2019/0244288 A1* | 8/2019 | Singh | ...................... | G06Q 40/04 |
| 2019/0279218 A1* | 9/2019 | Adjaoute | ............... | G06N 5/043 |
| 2019/0361739 A1* | 11/2019 | Burhani | ................ | G06Q 40/04 |
| 2019/0378050 A1* | 12/2019 | Edkin | ..................... | G06N 20/20 |
| 2020/0143208 A1* | 5/2020 | Hernandez Leal | .... | G06N 5/043 |
| 2021/0035214 A1* | 2/2021 | Kim | ........................ | G06N 3/044 |
| 2021/0073671 A1* | 3/2021 | Puri | ......................... | G06N 5/04 |
| 2021/0097343 A1* | 4/2021 | Goodsitt | ................ | G06N 3/088 |
| 2021/0398061 A1* | 12/2021 | Acuna Agost | ....... | G06Q 10/067 |

OTHER PUBLICATIONS

Iweidlich, Anke, and Daniel Veit. "A critical survey of agent-based wholesale electricity market models." Energy Economics 30.4 (2008): 1728-1759. (Year: 2008).*

Haghnevis, Moeed, Ronald G. Askin, and Dieter Armbruster. "An agent-based modeling optimization approach for understanding behavior of engineered complex adaptive systems." Socio-Economic Planning Sciences 56 (2016): 67-87. (Year: 2016).*

Lamperti F, Dosi G, Napoletano M, Roventini A, Sapio Al. Climate change and green transitions in an agent-based integrated assessment model. Technological Forecasting and Social Change. Apr. 1, 2020;153:119806. (Year: 2020).*

Csáji, Balázs Csanád, László Monostori, and Botond Kádár. "Reinforcement learning in a distributed market-based production control system." Advanced Engineering Informatics 20.3 (2006): 279-288. (Year: 2006).*

\* cited by examiner

METHOD AND SYSTEM FOR SIMULATION AND CALIBRATION OF MARKETS

CROSS-REFERENCE TO RELATED APPLICATIONS

This application claims the benefit from U.S. Provisional Application No. 63/104,161, filed Oct. 22, 2020, which is hereby incorporated by reference in its entirety.

BACKGROUND

1. Field of the Disclosure

This technology generally relates to methods and systems for simulating and calibrating a financial market, and more particularly to methods and systems for creating a realistic agent-based simulation of an over-the-counter market and using data from the real market to calibrate the simulator.

2. Background Information

Multi-agent learning in partially observable settings is a challenging task. When all agents have the same action and observation spaces, it has been shown that using a single shared policy network across all agents represents an efficient training mechanism. This network takes as input the individual agent observations and outputs individual agent actions, hence the terminology "decentralized execution." The network is trained by collecting all n agent experiences simultaneously and treating them as distinct sequences of local observations, actions, and rewards experienced by the shared policy. Since agents may have different observations at a given point in time, sharing a network still allows different actions across agents. It has also been observed that one can include in the agents' individual observations some agent-specific information, such as the agent index, to further differentiate agents when using the shared policy, thus allowing a certain form of heterogeneity among agents.

This raises a natural question, i.e., from a game theoretic standpoint, what is the nature of potential equilibria learned by agents using such a shared policy? A second question that follows from this concept is how can shared equilibria be constrained so that they match specific externally-specified targets? The latter is referred to as calibration, where input parameters of a multi-agent system (MAS) are calibrated so as to match externally-specified calibration targets, typically coming from real-world observations on the emergent behaviors of agents and groups of agents. For example, MAS modeling behaviors of people in a city may require that agents in equilibria take the subway no more than some number of times a day on average. Constraints can be achieved by having agents of different natures, or types, and optimally balancing those types so as to match the desired targets on the emergent behavior of agents. For example, it may be desired to optimally balance people living in the suburbs versus living inside a city so as to match the constraint on taking the subway. Even then, repeating the steps of picking a certain set of agent types and training the agents until equilibrium is reached and recording the associated calibration loss is prohibitively expensive.

Accordingly, there is a need for a mechanism for creating a realistic agent-based simulation of an over-the-counter market and using data from the real market to calibrate the simulator.

SUMMARY

The present disclosure, through one or more of its various aspects, embodiments, and/or specific features or sub-components, provides, inter alia, various systems, servers, devices, methods, media, programs, and platforms for creating a realistic agent-based simulation of an over-the-counter market and using data from the real market to calibrate the simulator.

According to an aspect of the present disclosure, a method for simulating a market is provided. The method is implemented by at least one processor. The method includes: assigning, by the at least one processor to each respective agent from among a plurality of agents, a type value that relates to a state of the respective agent; receiving, by the at least one processor, agent-specific data that relates to at least one from among a market-based observation, a market-based action, and a market-based reward; generating, by the at least one processor, a market simulation based on the assigned type values and the received agent-specific data; and calibrating, by the at least one processor, the market simulation based on actual market data.

The type value may be based on an agent incentive.

The generating of the market simulation may include applying a policy that indicates a probability of a respective individual agent action for a corresponding state of the respective individual agent.

The policy may include maximizing an incentive to the respective individual agent.

The calibrating may include applying a reinforcement learning calibration algorithm to historical market data in order to reconcile the market simulation with the actual market data.

The method may further include recording at least one metric that includes a result of the generated market simulation. The calibrating may include varying at least one respective type value based on the at least one metric and adjusting the reinforcement learning calibration algorithm based on the varied at least one respective type value.

The method may further include identifying a calibration target that relates to collective actions of the plurality of agents and optimizing the reinforcement learning calibration algorithm based on the calibration target.

The method may further include updating the policy based on a result of the calibrating; and recalibrating the market simulation based on the updated policy.

According to another aspect of the present disclosure, a computing apparatus for simulating a market is provided. The computing apparatus includes a processor; a memory; and a communication interface coupled to each of the processor and the memory. The processor is configured to: assign, to each respective agent from among a plurality of agents, a type value that relates to a state of the respective agent; receive, via the communication interface, agent-specific data that relates to at least one from among a market-based observation, a market-based action, and a market-based reward; generate a market simulation based on the assigned type values and the received agent-specific data; and calibrate the market simulation based on actual market data.

The type value may be based on an agent incentive.

The processor may be further configured to generate the market simulation by applying a policy that indicates a probability of a respective individual agent action for a corresponding state of the respective individual agent.

The policy may include maximizing an incentive to the respective individual agent.

The processor may be further configured to perform the calibrating by applying a reinforcement learning calibration algorithm to historical market data in order to reconcile the market simulation with the actual market data.

The processor may be further configured to record at least one metric that includes a result of the generated market simulation, and to perform the calibrating by varying at least one respective type value based on the at least one metric and adjusting the reinforcement learning calibration algorithm based on the varied at least one respective type value.

The processor may be further configured to identify a calibration target that relates to collective actions of the plurality of agents and optimize the reinforcement learning calibration algorithm based on the calibration target.

The processor may be further configured to: update the policy based on a result of the calibrating; and recalibrate the market simulation based on the updated policy.

According to yet another aspect of the present disclosure, a non-transitory computer readable storage medium storing instructions for simulating a market is provided. The storage medium includes executable code which, when executed by a processor, causes the processor to: assign, to each respective agent from among a plurality of agents, a type value that relates to a state of the respective agent; receive agent-specific data that relates to at least one from among a market-based observation, a market-based action, and a market-based reward; generate a market simulation based on the assigned type values and the received agent-specific data; and calibrate the market simulation based on actual market data.

The type value may be based on an agent incentive.

The executable code may be further configured to cause the processor to generate the market simulation by applying a policy that indicates a probability of a respective individual agent action for a corresponding state of the respective individual agent.

The executable code may be further configured to cause the processor to perform the calibrating by applying a reinforcement learning calibration algorithm to historical market data in order to reconcile the market simulation with the actual market data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
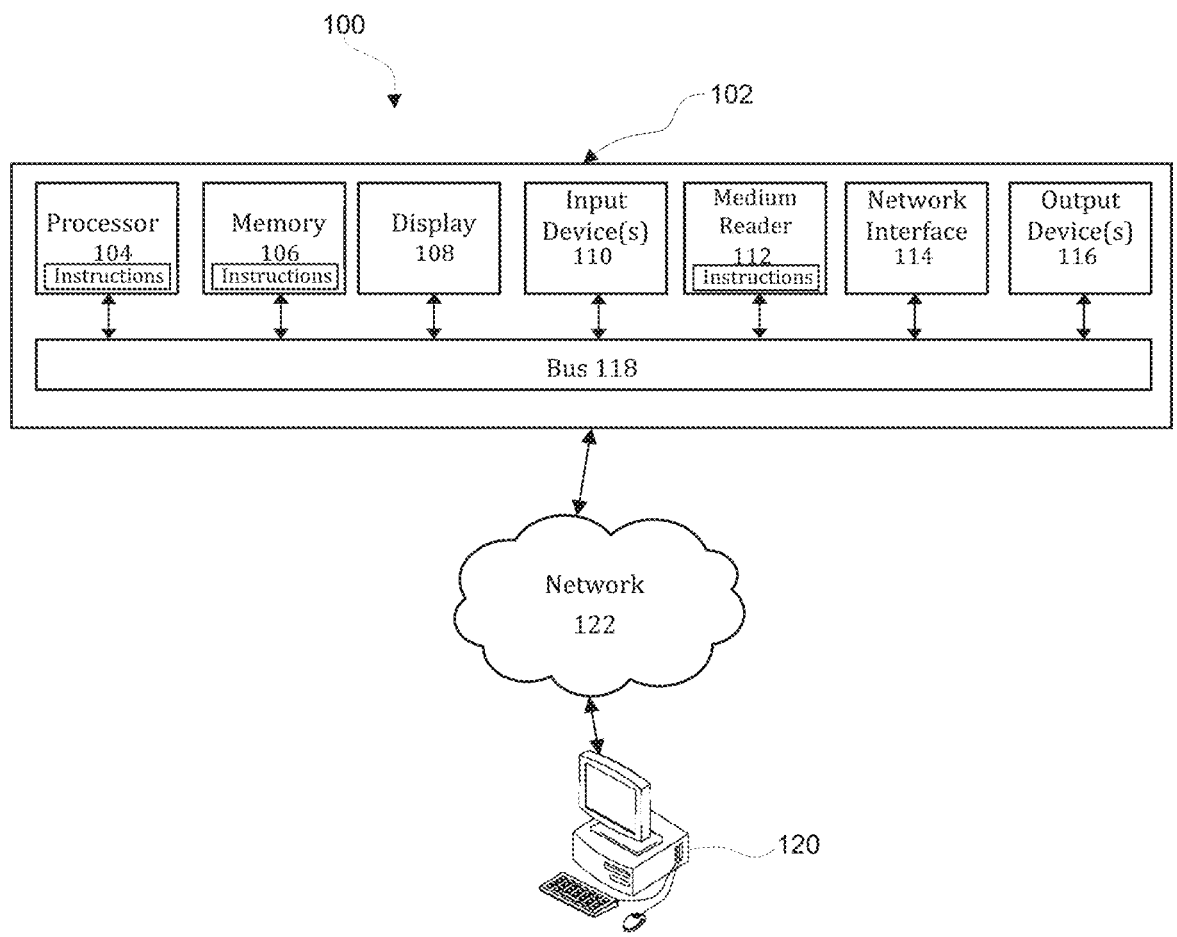
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for creating a realistic agent-based simulation of an over-the-counter market and using data from the real market to calibrate the simulator.

Figure 2:
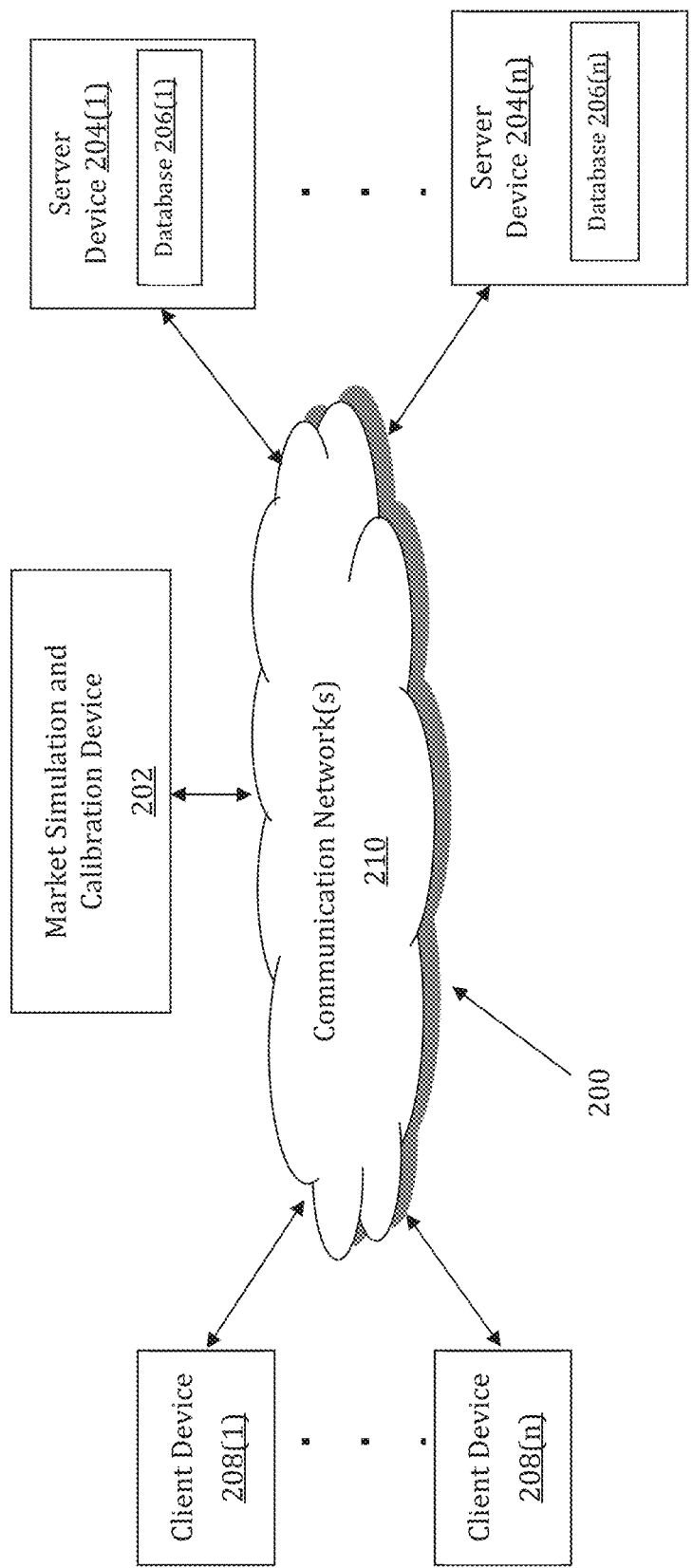
FIG. 2 illustrates an exemplary diagram of a network environment.

Referring to FIG. 2, a schematic of an exemplary network environment 200 for implementing a method for creating a realistic agent-based simulation of an over-the-counter market and using data from the real market to calibrate the simulator is illustrated. In an exemplary embodiment, the method is executable on any networked computer platform, such as, for example, a personal computer (PC).

The method for creating a realistic agent-based simulation of an over-the-counter market and using data from the real market to calibrate the simulator may be implemented by a Market Simulation and Calibration (MSC) device 202. The MSC device 202 may be the same or similar to the computer system 102 as described with respect to FIG. 1. The MSC device 202 may store one or more applications that can include executable instructions that, when executed by the MSC device 202, cause the MSC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MSC device 202 itself, may be located in virtual server(s) running in a cloud-based computing environment rather than being tied to one or more specific physical network computing devices. Also, the application(s) may be running in one or more virtual machines (VMs) executing on the MSC device 202. Additionally, in one or more embodiments of this technology, virtual machine(s) running on the MSC device 202 may be managed or supervised by a hypervisor.

In the network environment 200 of FIG. 2, the MSC device 202 is coupled to a plurality of server devices 204(1)-204(n) that hosts a plurality of databases 206(1)-206(n), and also to a plurality of client devices 208(1)-208(n) via communication network(s) 210. A communication interface of the MSC device 202, such as the network interface 114 of the computer system 102 of FIG. 1, operatively couples and communicates between the MSC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MSC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MSC devices that efficiently implement a method for creating a realistic agent-based simulation of an over-the-counter market and using data from the real market to calibrate the simulator.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MSC device 202 may be a standalone device or integrated with one or more other devices or apparatuses, such as one or more of the server devices 204(1)-204(n), for example. In one particular example, the MSC device 202 may include or be hosted by one of the server devices 204(1)-204(n), and other arrangements are also possible. Moreover, one or more of the devices of the MSC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MSC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical market data and data that relates to simulation parameters and results.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MSC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MSC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MSC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MSC device 202, the server devices 204(1)-204(n), or the client devices 208(1)-208(n), for example, may be configured to operate as virtual instances on the same physical machine. In other words, one or more of the MSC device 202, the server devices 204(1)-204(n), or the client devices 208(1)-208(n) may operate on the same physical device rather than as separate devices communicating through communication network(s) 210. Additionally, there may be more or fewer MSC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
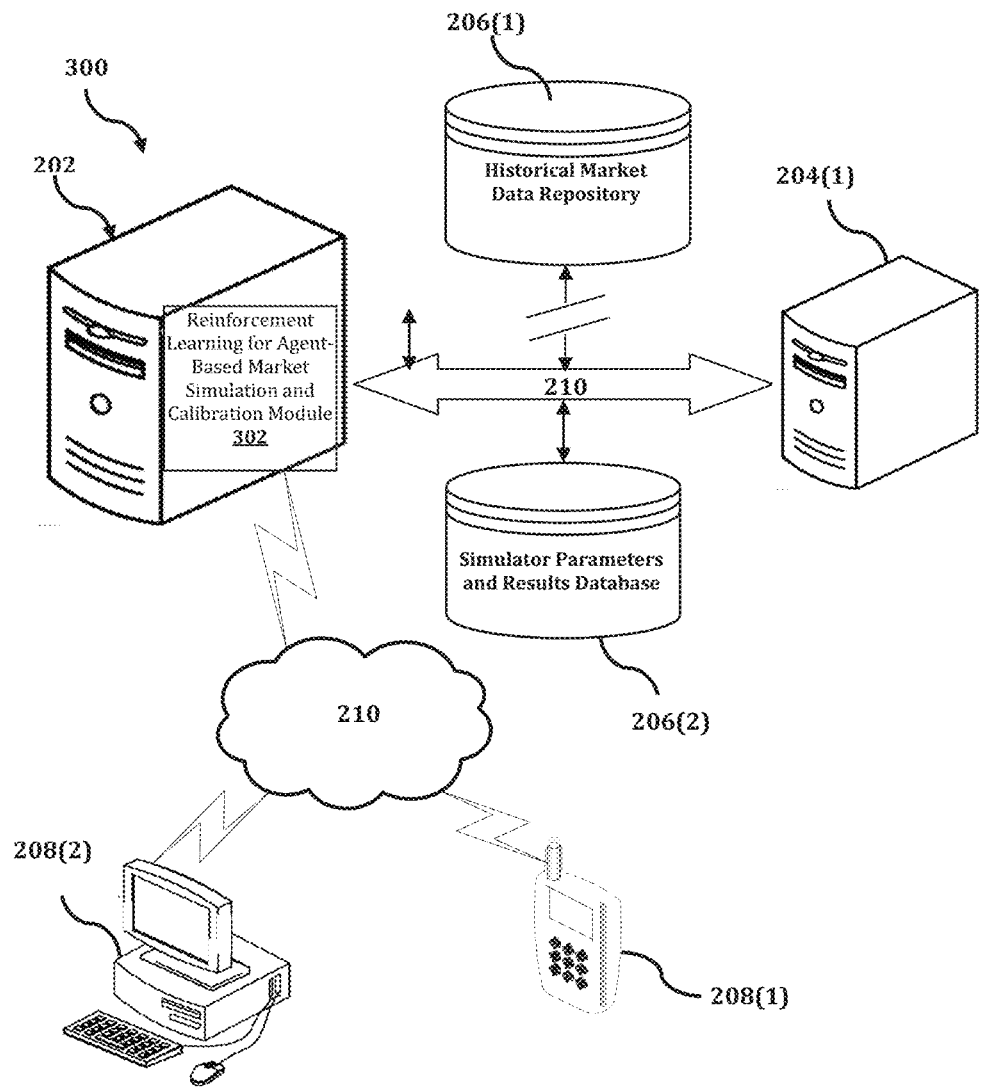
FIG. 3 shows an exemplary system for implementing a method for creating a realistic agent-based simulation of an over-the-counter market and using data from the real market to calibrate the simulator.

The MSC device 202 is described and illustrated in FIG. 3 as including a reinforcement learning for agent-based market simulation and calibration module 302, although it may include other rules, policies, modules, databases, or applications, for example. As will be described below, the reinforcement learning for agent-based market simulation and calibration module 302 is configured to implement a method for creating a realistic agent-based simulation of an over-the-counter market and using data from the real market to calibrate the simulator.

An exemplary process 300 for implementing a mechanism for creating a realistic agent-based simulation of an over-the-counter market and using data from the real market to calibrate the simulator by utilizing the network environment of FIG. 2 is illustrated as being executed in FIG. 3. Specifically, a first client device 208(1) and a second client device 208(2) are illustrated as being in communication with MSC device 202. In this regard, the first client device 208(1) and the second client device 208(2) may be "clients" of the MSC device 202 and are described herein as such. Nevertheless, it is to be known and understood that the first client device 208(1) and/or the second client device 208(2) need not necessarily be "clients" of the MSC device 202, or any entity described in association therewith herein. Any additional or alternative relationship may exist between either or both of the first client device 208(1) and the second client device 208(2) and the MSC device 202, or no relationship may exist.

Further, MSC device 202 is illustrated as being able to access a historical market data repository 206(1) and a simulator parameters and results database 206(2). The reinforcement learning for agent-based market simulation and calibration module 302 may be configured to access these databases for implementing a method for creating a realistic agent-based simulation of an over-the-counter market and using data from the real market to calibrate the simulator.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MSC device 202 via broadband or cellular communication. Of course, these embodiments are merely exemplary and are not limiting or exhaustive.

Upon being started, the reinforcement learning for agent-based market simulation and calibration module 302 executes a process for creating a realistic agent-based simulation of an over-the-counter market and using data from the real market to calibrate the simulator. An exemplary process for creating a realistic agent-based simulation of an over-the-counter market and using data from the real market to calibrate the simulator is generally indicated at flowchart 400 in FIG. 4.

Figure 4:
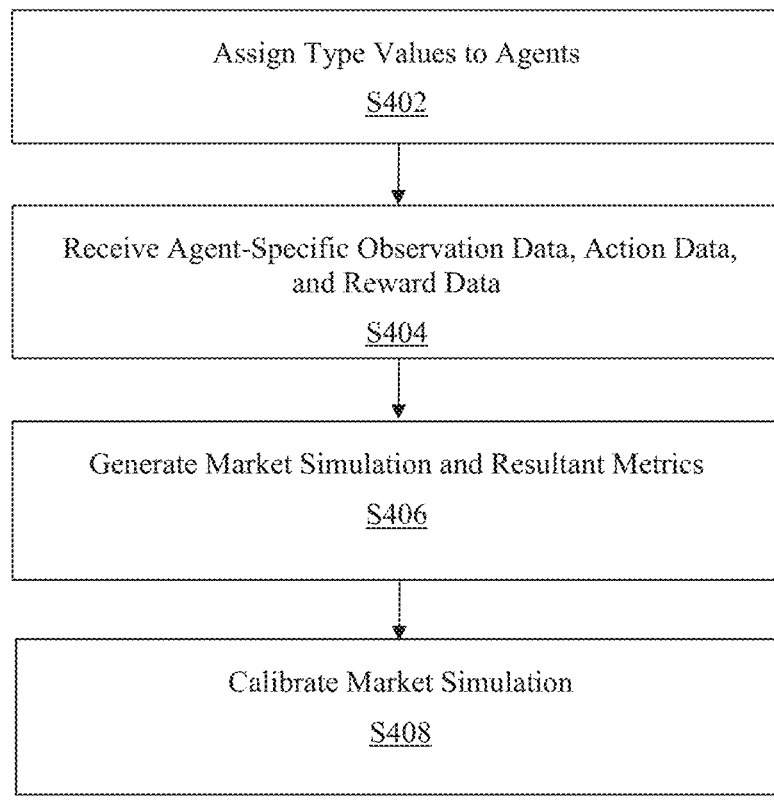
FIG. 4 is a flowchart of an exemplary process for implementing a method for creating a realistic agent-based simulation of an over-the-counter market and using data from the real market to calibrate the simulator.

In process 400 of FIG. 4, at step S402, the reinforcement learning for agent-based market simulation and calibration module 302 assigns a type value to each of a plurality of agents. In an exemplary embodiment, each investor agent generates trades according to a fixed distribution that is specific to the type to which that agent belongs, and executes the trades at the best prices available. For each market maker agent i, a risk aversion $\gamma_i$ and a connectivity to investors $C_i$ is specified. In an exemplary embodiment, the use of agent supertypes allows for such a specification in a scalable manner: Each supertype specifies a probability distribution over risk aversion and connectivity $\lambda: =[\gamma, C]$; and each market maker draws $\lambda_i$ from the distribution specified for its supertype at the beginning of each episode. In an exemplary embodiment, the assignment of the type values and/or supertype values is based on agent incentives.

At step S404, the reinforcement learning for agent-based market simulation and calibration module 302 receives agent-specific data that relates to at least one from among a market-based observation, a market-based action, and a market-based reward. In an exemplary embodiment, an observation may include, for example, trades executed by a market maker in t−1; inventory, defined as $Z_t = Z_{t−1}$ + net of executed trades in t−1; and exchange, defined as mid-price $P_t$ and the bid/ask spreads $S^b_{ref}(v)$ and $S^a_{ref}(v)$ for trade size v. An action may include, for example, stream bid/ask spreads $S^b(v)$ and $S^a(v)$ to investors, and/or hedging some fraction of current inventory $Z_t$ by trading at exchange. A reward may include, for example, a spread profit and loss (P&L), defined for each executed trade as $= v*S^{b/a}(v)$; inventory P&L, defined as change in value of inventory $= Z_t*(P_t − P_{t−1})$; hedge cost, defined as a spread paid for hedging $= x*|Z_t|*S^{b/a}_{ref}(v)$; and risk cost, defined as the absolute value of inventory P&L.

At step S406, the reinforcement learning for agent-based market simulation and calibration module 302 generates a market simulation based on the type values assigned in step S402 and the agent-specific data received in step S404. In an exemplary embodiment, the generation of the market simulation may include applying a policy that indicates a probability of a respective individual agent action for a corresponding state of that individual agent, such as, for example, a policy of maximizing an incentive to the individual agent. The market simulation may generate results thereof that may be recorded as metrics.

At step S408, the reinforcement learning for agent-based market simulation and calibration module 302 calibrates the market simulation based on actual market data. In an exemplary embodiment, the calibrating may be performed by applying a reinforcement learning calibration algorithm to historical market data in order to reconcile the market simulation with the actual market data. In an exemplary embodiment, the calibrating may include varying at least one of the assigned type values based on one or more of the metrics that result from the market simulation, and then adjusting the reinforcement learning calibration algorithm based on the variation in the type value. The method may also include identifying a calibration target that relates to collective actions of the plurality of agents and optimizing the reinforcement learning calibration algorithm based on the calibration target.

In an exemplary embodiment, the reinforcement learning for agent-based market simulation and calibration module 302 may use a result of the calibration to update the policy that is applied in the generation of the market simulation in step S408, and then recalibrate the market simulation based on the updated policy.

In an exemplary embodiment, a problem to be addressed may be understood as how to determine the nature of potential equilibria learned by agents using a shared policy and how to constrain shared equilibria so that they match specific externally-specified targets. In an exemplary embodiment, an approach to solving this problem is provided by introducing a reinforcement learning (RL) calibrator whose goal is to optimally balance types of agents so as to match the calibration target, and which learns jointly with RL agents learning a shared equilibrium. The result, referred to herein as calibration of shared equilibria ("CALSHEQ"), is a dual RL-based algorithm for calibration of shared equilibria to external targets. CALSHEQ calibrates parameters governing distributions of agent types, also referred to herein as supertypes, rather than individual agents, thereby allowing both behavior differentiation among agents and coherent scaling of the shared policy network to multiple agents.

Shared Equilibria in General Sum Partially Observable Markov Games: Consideration is given to an n-player partially observable Markov game where all agents share the same action and state spaces A and S. No specific assumption on the state spaces is made unless specifically mentioned. The joint action and state is denoted as $a_t$: $(a_t^{(1)} \ldots, a_t^{(n)}$ and $s_t$: $(s_t^{(1)} \ldots, s_t^{(n)})$. It is assumed that each agent i can only observe its own states $s_t^{(i)}$ and actions $a_t^{(i)}$, hence the partial observability.

Agent types and supertypes: In order to differentiate agents, to each agent i a supertype $\Lambda_i \in S^\Lambda$, is assigned, with $\Lambda := (\Lambda_i)_{i \in [1,n]}$. At the beginning of each episode, agent i is assigned a type $\lambda_i \in A^\lambda$ sampled probabilistically as a function of its supertype, namely $\lambda_i \sim p_\Lambda$ for some probability density function $p_\Lambda$, and initial states $s^{(i)}$ are sampled independently according to the distribution $\mu^0_{\lambda_i}$. This is formally equivalent to extending agents' state space to $S \times S^\lambda$, with a transition kernel that keeps $\lambda_i$ constant throughout an episode and equal to its randomly sampled value at t=0. Supertypes are convenient as they allow to think of agents in terms of distributions of agents, and not at individual level, which allows to scale the simulation in a coherent way. In this sense they can be seen as behavioral templates according to which agents can be cloned. Typically, groups of agents who share the same supertype are created, so that the number of distinct supertypes is typically much less than the number of agents. In an exemplary embodiment, the agent index can be included in its state: this is the special case where the supertype is that number, and the type can only take one value equal to the supertype.

Rewards, state transition kernel and type symmetry assumption: Let $z^{(i)} := (s^{(i)}, a^{(i)}, \lambda_i)$. At each time t, agent i receives an individual reward $R(z^{(i)}, z^{(-i)})$, where the vector $z^{(-i)} := z^{(j)}$ where $j \neq i$. The state transition kernel $T: (S \times A \times S^\lambda)^n \times S^n \to [0, 1]$ is denoted $T(z_t, s_t^J)$, and represents the probability to reach the joint state $s_t^J$ conditionally on agents having the joint state/action/type structure $z_t$. Assumptions are made on the rewards and state transition kernel that are called type-symmetry, for which the purpose is to guarantee that the expected reward of an agent only depends on its supertype $\Lambda_i$. Specifically, it is assumed that R is invariant with respect to permutations of the n−1 entries of its second argument $z^{(-i)}$, and that for any permutation p, we have $T(z^p, s^{Jp}) = T(z_t, s^J)$, where $z^p, s^{Jp}$ are the permuted vectors. In plain words, the latter guaranties that from the point of view of a given agent, all other agents are interchangeable, and that two agents with equal supertypes and policies have the same expected cumulative reward.

Shared policy conditioned on agent type: In the parameter sharing approach with decentralized execution, agents use a common policy π, which is a probability over individual agent actions $a^{(i)}$ given a local state $s^{(i)}$. This policy is trained with the experiences of all agents simultaneously, and allows different actions among agents since they have different local states. In an exemplary embodiment, the agent type $\lambda_i$ is included in the local states and hence define the shared policy over the extended agent state space $S \times S^\lambda$. Denoting X the space of functions $S \times S^\lambda \to \Delta(A)$, where $\Delta(A)$ is the space of probability distributions over actions, the following expression is defined as Equation 1:

$$X := S \times S^\lambda \to \Delta(A), \pi(a|s, \lambda) := P\ a^{(i)} \in da|s^{(i)} = s, \lambda_i = \lambda, \pi \in X. \quad (1)$$

Note that as often done so in imperfect information games, a hidden variable h can be added in $\pi(a, s_t, h_{t-1}, \lambda)$ to encode the agent history of observations. To ease notational burden, it is not included in the following, but this is without loss of generality since h can always be encapsulated in the state. Due to the type-symmetry assumptions above and given that agents' initial states are sampled independently according to the distributions $\mu^0$, it may be seen that the expected reward of each agent i only depends on its supertype $\Lambda_i$ and the shared policy $\pi$ (i.e., it also depends on other agents' supertypes $\Lambda_{-i}$ independent of their ordering, but since a fixed supertype profile $\Lambda$ is used, $\Lambda_{-i}$ is fixed when $\Lambda_i$ is). The following definition is provided as Equation 2, which is slightly more general in that it allows agents j≠i to use a different policy $\pi_2 \in X$, where $\gamma \in [0, 1)$ is the discount factor:

$$V_{\Lambda_i}(\pi_1, \pi_2) := \mathbb{E}_{\substack{s \sim p\Lambda_i, a_t^{(i)} \sim \pi_1(\cdot|\lambda_i) \\ s \sim p\Lambda_j, a_t^{(i)} \sim \pi_2(\cdot|\lambda_i)}} \left[ \sum_{t=0}^{\infty} \gamma^i R(z_t^{(i)}, z_t^{(-i)}) \right], \quad (2)$$

$$i \neq j \in [1, n],$$

$$\pi_1, \pi_2 \in \chi.$$

$V_{\Lambda_i}(\pi_1, \pi_2)$ is to be interpreted as the expected reward of an agent of supertype $\Lambda_i$ using $\pi_1$, while all other agents are using $\pi_2$.

The question of what are then the game theoretic implications of agents of different types using a shared policy is now addressed. Intuitively, it is assumed that two players are asked to submit algorithms to play chess that will compete against each other. Starting with the white or dark pawns presents some similarities as it is chess in both cases, but also fundamental differences, hence the algorithms need to be good in all cases, whatever the type (white or dark) assigned by the random coin toss at the start of the game. The two players are playing a higher-level game on the space of algorithms that requires the submitted algorithms to be good in all situations. This also means that consideration will be given to games where there are "good" strategies, formalized by the concept of extended transitivity in Assumption 1 below, and relied upon by Theorem 1 below.

Shared policy gradient and the higher-level game V. In the parameter sharing framework, $\pi = \pi_\theta$ is a neural network with weights θ, and the gradient $\nabla_{\theta,B}^{VPG}$ according to which the shared policy $\pi_\theta$ is updated (i.e., where B is the number of episodes sampled) is computed by collecting all agent experiences simultaneously and treating them as distinct sequences of local states, actions and rewards $s^{(i)}$, $a^{(i)}$, $R(z^{(i)}, z^{(-i)})$ experienced by the shared policy, yielding the following expression as Equation 3 under vanilla policy gradient, similar to the single-agent case:

$$\nabla_{\theta,B}^{VPG} = \frac{1}{n} \sum_{i=1}^{n} g_i^B, \quad (3)$$

$$g_i^B := \frac{1}{B} \sum_{b=1}^{B} \sum_{i=0}^{\infty} \nabla_\theta \ln \pi_\theta(a_{t,b}^{(i)} | s_{t,b}^{(i)}, \lambda_{i,b}) \sum_{t'=t}^{\infty} \gamma^{t'} \mathcal{R}(z_{t',b}^{(i)}, z_{t',b}^{(-i)})$$

Note that by the strong law of large numbers, taking B=+∞ in Equation 3 simply amounts to replacing the average by an expectation as in Equation 2 with $\pi_1 = \pi_2 = \pi_\theta$. Proposition 1 is a key observation and sheds light upon the mechanism underlying parameter sharing in Equation 3: in order to update the shared policy, all agents are set to use the same policy $\pi_\theta$; and one agent is picked at random and a step is taken towards improving its individual reward while keeping other agents on $\pi_\theta$: by Equation 4 below, this yields an unbiased estimate of the gradient $\nabla_{\theta,\infty}^{VPG}$. Sampling many agents at random $\alpha \sim U[1, n]$ in order to compute the expectation in Equation 4 below will yield a less noisy gradient estimate but will not change its bias. In Equation 4, V is to be interpreted as the utility received by a randomly chosen agent behaving according to $\pi_1$ while all other agents behave according to $\pi_2$.

Proposition 1: For a function $f(\theta_1, \theta_2)$, let $\nabla_{\theta_i} f(\theta_1, \theta_2)$ be the gradient with respect to the first argument. Then Equation 4 follows:

$$\nabla_{\theta,\infty}^{VPG} = \nabla_{\theta_1} \hat{V}(\pi_\theta, \pi_\theta), \hat{V}(\pi_1, \pi_2) := \mathbb{E}_{\alpha \sim U[1,n]}[V_{\Lambda_\alpha}(\pi_1, \pi_2)], \pi_1, \pi_2 \in \chi \quad (4)$$

where $\mathbb{E}_{\alpha \sim U[1,n]}$ indicates that the expectation is taken over α random integer in [1,n].

Shared Equilibria: A 2-player game is said to be symmetric if the utility received by a player only depends on its own strategy and on its opponent's strategy, but not on the player's identity, and that a pure strategy Nash equilibrium $(\pi_1^*, \pi_2^*)$ is said to be symmetric if $\pi_1^* = \pi_2^*$. For such games, due to symmetry, payoff$(\pi_1, \pi_2)$ refers to the utility received by a player playing $\pi_1$ while the other player plays $\pi_2$.

Equation 4 suggests that the shared policy is a Nash equilibrium of the 2-player symmetric game with payoff V, where by the definition of the term "payoff", the first player receives $V(\pi_1, \pi_2)$ while the other receives $V(\pi_2, \pi_1)$. This is because $_{\theta_1} V(\pi_\theta, \pi_\theta)$ in (4) corresponds to trying to improve the utility of the first player while keeping the second player fixed, starting from the symmetric point $(\pi_\theta, \pi_\theta)$. If no such improvement is possible, a symmetric Nash equilibrium then exists, because due to symmetry of the game, no improvement is possible either for the second player starting from the same point $(\pi_\theta, \pi_\theta)$. The game with payoff V can be seen as an abstract game (i.e., since the 2 players are not part of the n agents) where each element of the strategy set (that is, every pure strategy) is a policy π defined in Equation 1 above. This motivates the following definition:

Definition 1. (Shared Equilibrium) A shared equilibrium π* associated to the supertype profile Λ is defined as a pure strategy symmetric Nash equilibrium (π*, π*) of the 2-player symmetric game with pure strategy set X and payoff V in Equation 4.

The natural question is now: Under which conditions do shared equilibria exist, and can the self-play mechanism in Equation 4 lead to such equilibria? To answer this question, a new concept of transitivity is introduced, it is called extended transitivity:

Assumption 1. (extended transitivity) A 2-player symmetric game with pure strategy set S and payoff u is said to be extended transitive if there exists a bounded function T such that:

∀E>0,∃δ_E>0: ∀x,y∈S: if u(y,x)−u(x,x)>E, then T(y)−T(x)>δ_E.

The intuition behind Assumption 1 is that T can be seen as the game "skill" that is being learned whenever a player finds a profitable deviation from playing against itself. It will be required in Theorem 1 to prove the existence of shared equilibria, which is an important result. Further, it will be proved that such equilibria are reached by following self-play previously discussed, thus showing that policy updates based on Equation 4 with per-update improvements of at least ϵ achieve E-shared equilibria within a finite number of steps.

Definition 2. A $(f,\epsilon)$-self-play sequence $(x_n, y_n)_{0 \leq u \leq 2N}$ of size $0 \leq 2N \leq \infty$ generated by $(z_n)_{n \geq \alpha}$ is a sequence such that for every n, $x_{2n}=y_{2n}=z_n$, $(x_{2n+1}, y_{2n+1})=(z_{n+1}, z_n)$ and $f(x_{2n+1}, y_{2n+1}) > f(x_{2n}, y_{2n}) + \epsilon$.

Lemma 1. Assume that the rewards R are bounded, and that S, A and $S^\lambda$ are finite. Then $V_\Lambda$ is continuous on X×X for all i, where X is equipped with the total variation metric.

Theorem 1. Let Λ be a supertype profile. Assume that the symmetric 2-player game with pure strategy set and payoff V is extended transitive. Then, there exists an E-shared equilibrium for every E>0, which further can be reached within a finite number of steps following a (V, E)-self-play sequence. Further, if S, A and $S^\lambda$ are finite and the rewards R are bounded, then there exists a shared equilibrium. In particular, if $(\pi_{\theta_n})_{n \geq 0}$ is a sequence of policies obtained following the gradient update of Equation 4 with V $(\pi_{\theta_{n+1}}, \pi_{\theta_n}) > V (\pi_{\theta_n}, \pi_{\theta_n}) + E$, then $(\pi_{\theta_n})_{n \geq 0}$ generates a finite (V, E)-self-play sequence and its endpoint $(\pi_E, \pi_E)$ is an E-shared equilibrium.

Calibration of shared equilibria: The question of calibration is now addressed. In an exemplary embodiment, calibration refers to acting on the supertype profile Λ so as to match externally specified targets on the shared equilibrium. In a game that satisfies the conditions of Theorem 1, agents will reach a shared equilibrium associated to Λ. For the multi-agent system to accurately model a given real world system, it would be preferred for the emergent behavior of agents in that equilibrium to satisfy certain constraints. For example, in an n player market setting, one may want certain market participants to average a certain share of the total market in terms of quantity of goods exchanged, or to only receive certain specific quantities of these goods. The difficulty is that for every choice of Λ, one should in principle train agents until equilibrium is reached and record the associated calibration loss, and repeat this process until the loss is small enough, which is prohibitively expensive. The baseline considered herein follows this philosophy by periodically trying new Λ obtained via Bayesian optimization (BO). One issue is that BO can potentially perform large moves in the supertype space, hence changing Λ too often could prevent the shared policy to correctly learn an equilibrium since it would not be given sufficient time to adapt.

In an exemplary embodiment, one solution is therefore to smoothly vary Λ during training: a RL calibrator agent with a stochastic policy is introduced, whose goal is to optimally pick Λ and who learns jointly with RL agents learning a shared equilibrium, but under a slower timescale. The two-timescale stochastic approximation framework is well-suited to this problem, as it allows the RL calibrator's policy to be updated more slowly than the agents' shared policy, yet simultaneously, thus giving enough time to agents to approximately reach an equilibrium. This RL-based formulation allows for further exploitation of smoothness properties of some RL algorithms. This formulation is general enough to accommodate the case where Λ is a distribution $f(\Lambda)$ over supertypes. The following definition is provided for new supertypes $\Lambda^-_i := f_i(\Lambda_i)$, where $f_1$ is the marginal distribution of $\Lambda_1$, and for $i \geq 2$, $f_i$ is the distribution of $\Lambda_i$ conditional on $(\Lambda_k)_{k \leq i-1}$ (induced by $f$). This means that instead of a fixed Λ, one can choose a distribution $f(\Lambda)$, and in that case it is important to see that the shared policy at equilibrium will depend on the distribution $f$ rather than on a fixed supertype profile.

The RL calibrator's state is the current supertype Λ, and its action is a vector of increments δΛ to apply to the supertypes, resulting in new supertypes Λ+δΛ, where it is assumed that $\Lambda_i$ takes value in some subset of Rd. For this approach, the goal of the RL calibrator is to learn optimal directions to take in the supertype space, given a current location. The RL calibrator has full knowledge of the information across agents and is given K externally specified targets $f^{*(k)} \in R$ for functions of the form $f_{cal}^{(k)}((z_t)_{t \geq 0})$. Its reward $\gamma^{cal}$ will then be a weighted sum of the inverse of losses $l_k$, $\gamma^{cal} = \Sigma_{k=1}^K \omega_k l_k^{-1}(f^{*(k)} - f_{cal}^{(k)}((z_l)_{l \geq 0}))$. The result is Algorithm 1 below, where at stage m=1, the supertype profile $\Lambda_l$ is sampled across episodes b as $\Lambda_1^b \sim \Lambda_0 + \delta\Lambda^b$, with $\delta\Lambda^b \sim \pi_1^\Lambda(\cdot|\Lambda_o)$ and where $\tilde{\pi}_1^\Lambda := \Lambda_o + \pi_1^\Lambda(\cdot|\Lambda_o)$ is denoted as the resulting distribution of $\Lambda_1$. Then, multi-agent episodes b are run according to Equation 2, each one with its supertype profile, and record the reward $r_b^{cal}$, thus corresponding to the calibrator state $\Lambda_o$ and action $\delta\Lambda^b$. The process is repeated, yielding for each episode b at stage m≥2, $\Lambda_m^b \sim \Lambda_{m-1}^b + \pi_m^\Lambda(\cdot|\Lambda_{m-1}^b)$, resulting in a distribution $\tilde{\pi}_m^\Lambda$ for $\Lambda_m$, empirically observed through the sampled $\{\Lambda_m^b\}_{b=1, \ldots, B}$. As a result, the calibrator's policy $\pi^\Lambda$ optimizes the following objective of stage m as expressed in Equation 5:

$$V_{\pi_m}^{calib}(\pi_m^\Lambda) := \mathbb{E}_{\Lambda \sim \tilde{\pi}_{m-1}^\Lambda, \Lambda' \sim \pi_m^\Lambda(\cdot|\Lambda) + \Lambda, \lambda_s \sim p\lambda_i^\gamma, a_i^{(i)} \sim \pi_m(\cdot|\cdot,\lambda_i)} [r^{cal}] \qquad (5)$$

Algorithm 1 (CALSHEQ): Calibration of Shared Equilibria
Input: learning rates $(\beta_m^{cal})$, $(\beta_m^{shared})$ satisfying Assumption 2 below, initial calibrator and shared policies $\pi_0^\Lambda$, $\pi_0$, initial supertype profile $\Lambda_0^b = \Lambda_0$ across episodes b∈ [1,B]
1: while $\pi_m^\Lambda$, $\pi_m$ not converged do
2: for each episode b∈ [1, B] do
3: Sample supertype increment and set $\delta\Lambda^b \sim \pi_m^\Lambda(\cdot|\Lambda_{m-1}^b)$ and set $\Lambda_m^b := \Lambda_{m-1}^b + \delta\Lambda^b$
4: Sample multi-agent episode with supertype profile $\Lambda_m^b$ and shared policy $\pi_m$, with $\lambda_i \sim p_{\Lambda_m^b}$, $\alpha_l^{(i)} \sim \pi_m(\cdot|\cdot, \lambda_i)$, i∈ [1, n]
5: update $\pi_m$ with learning rate $\beta_m^{shared}$ based on gradient of Equation 4 and episodes b∈ [1,B]
6: update $\pi_m^\Lambda$ with learning rate $\beta_m^{cal}$ based on gradient to Equation 5 with episodes b∈ [1,B]

Assumption 2: The learning rates $(\beta_m^{cal})$, $(\beta_m^{shared})$ satisfy $$\frac{\beta_m^{cal}}{\beta_m^{shared}} \xrightarrow{m \to +\infty} 0,$$

as well as the Robbins-Monro conditions, that is their respective sum is infinite, and the sum of their squares is finite.

Based on an assumption that the distribution $\tilde{\pi}_m^\Lambda$ is mostly driven by $\pi_m^\Lambda$, then updating the calibrator's policy more slowly will give enough time to the shared policy for equilibria to be approximately reached; since $\pi_m^\Lambda$ is a distribution conditional on the previous supertype location, it is reasonable to assume that as learning progresses, it will compensate the latter and yield a distribution $\tilde{\pi}_m^\Lambda$ approximately independent from $\tilde{\pi}_{m-1}^\Lambda$.

Accordingly, with this technology, an optimized process for creating a realistic agent-based simulation of an over-the-counter market and using data from the real market to calibrate the simulator is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing a simulation, the method being implemented by at least one processor in a market simulation and calibration device, the method comprising:
   assigning, by the at least one processor to each respective computer agent from among a plurality of computer agents, a type value that relates to a state of the respective computer agent, such that the plurality of computer agents have differing type values, each of the differing type values indicating a different probability distribution of risk aversion and connectivity to external clients;
   receiving, by the at least one processor and from a plurality of servers over a network, computer agent-specific data for the plurality of computer agents, the plurality of computer agents including computer agents of different types that behave differently, wherein the computer agent-specific data include real-world data that include a market-based observation, a market-based action and a market-based reward;
acquiring, by the at least one processor and from a network database over the network, simulator parameters;
generating, by a simulation processor of the market simulation and calibration device and providing on a display of the market simulation and calibration device, a simulation based on the assigned type values, the acquired simulator parameters and the received computer agent-specific data for each of the plurality of computer agents being in a different state and by using a shared policy that is shared by all of the plurality of computer agents, wherein the shared policy indicates a probability of a respective individual computer agent action for a corresponding state of the respective individual computer agent, wherein each of the plurality of computer agents use the same shared policy, and wherein each of the plurality of computer agents is restricted to observe only its own state and action to achieve partial observability;
acquiring actual real-world data of agent-specific data corresponding to a target locality;
performing first reinforcement learning calibration on the simulation processor of the market simulation and calibration device for performing the simulation,
wherein the first reinforcement learning calibration is performed using the actual real-world data to first constrain a shared equilibria to match a specific real-world target value,
wherein the first reinforcement learning calibration using the actual real-world data specifies a distribution of different computer agent types to correspond to the first constrained shared equilibria,
wherein the distribution of the different computer agent types is reflected on the market simulation and calibration device,
wherein the specific real-world target value for each of the plurality of computer agents is different to collectively satisfy certain constraints,
wherein the first reinforcement learning calibration includes modifying at least one of the type values assigned to the plurality of computer agents based on a result of the simulation until a calibration target is reached, and
wherein the first reinforcement learning calibration is performed by:
inputting learning rates $(\beta_m^{cal})$, $(\beta_m^{shared})$ satisfying a target condition, initial calibrator and shared policies $\pi_0^\Lambda$, $\pi_0$, initial supertype profile $\Lambda_0^b = \Lambda_0$ across episodes $b \in [1,B]$,
while $\pi_m^\Lambda$, $\pi_m$ not converged do, wherein $\pi_m^\Lambda$, $\pi_m$ is a calibrator and shared policies for stage m,
for each episode $b \in [1, B]$ do,
sample supertype increment and set $\delta\Lambda^b \sim \pi_m^\Lambda(\cdot|\Lambda_{m-1}^b)$ and set $\Lambda_m^b := \Lambda_{m-1}^b + \delta\Lambda^b$,
sample multi-agent episode with supertype profile $\Lambda_m^b$ and shared policy $\pi_m$, with $\lambda_i \sim p_{\Lambda_{m-1}^b}$, $\alpha_t^{(i)} \sim \pi_m(\cdot|\cdot, \lambda_i)$, $i \in [1, n]$,
update $\pi_m$ with learning rate $\beta_m^{shared}$ based on gradient of a first equation with the episodes $b \in [1,B]$,
update $\pi_m^\Lambda$ with learning rate $\beta_m^{cal}$ based on gradient to a second equation with episodes $b \in [1,B]$,
the target condition specifies that the learning rates $(\beta_m^{cal})$, $(\beta_m^{shared})$ satisfy $$\frac{\beta_m^{cal}}{\beta_m^{shared}} \xrightarrow{m \to +\infty} 0,$$

as well as Robbins-Monro conditions, that is their respective sum is infinite, and sum of their squares is finite,
the first equation specifies:

$$\nabla_{\theta,\infty}^{VPG} = \nabla_{\theta_1} \hat{V}(\pi_\theta, \pi_\theta), \hat{V}(\pi_1, \pi_2) := \mathbb{E}_{a \sim U[1,n]}[V_{\Lambda_a}(\pi_1, \pi_2)], \pi_1, \pi_2 \in \mathcal{X},$$

wherein the first equation indicates that the shared policy is a Nash equilibrium of the 2-player symmetric game with payoff V, wherein a first player receives V $(\pi_1, \pi_2)$ while the other receives V $(\pi_2, \pi_1)$, and wherein $_{\theta_1}$V $(\pi_\theta, \pi_\theta)$ corresponds to trying to improve utility of the first player while keeping the second player fixed, starting from the symmetric point $(\pi_\theta, \pi_\theta)$, and
the second equation specifies:

$$V_{\pi_m}^{calib}(\pi_m^A) := \mathbb{E}_{A \sim \pi_{m-1}^A, A' \sim \pi_m^A(\cdot|A) + A, \lambda_i \sim P_{A_6'}, a_t^{(i)} \sim \pi_m(\cdot|\cdot, \lambda_i)}[r^{cal}],$$

wherein the second equation optimizes an objective of the stage m via a
calibrator's policy $\pi^\Lambda$;
updating the shared policy for the generating of the simulation by the simulation processor of the market simulation and calibration device based on a result of the first reinforcement learning calibration including the modifying of the at least one of the type values assigned to the plurality of computer agents, wherein the updated shared policy modifies the probability of the respective individual computer agent action for the corresponding state of the respective individual computer agent based on the distribution of the different computer agent types corresponding to the first constrained shared equilibria for at least one of the plurality of computer agents;
regenerating, by the simulation processor of the market simulation and calibration device, the simulation using the updated shared policy for obtaining a different output; and
performing second reinforcement learning calibration on the simulation processor of the market simulation and calibration device based on the first reinforcement learning calibration to modify the distribution of different computer agent types differently from the distribution of different computer agent types corresponding to the first reinforcement learning calibration, and to second constrain the share equilibria to more accurately constrain the shared equilibria than the first constrain of the shared equilibria in order to more closely match the specific real-world target value corresponding to the target locality, wherein the modified distribution of the different computer agent types are updated on the market simulation and calibration device.

2. The method of claim 1, wherein the type value is based on an agent incentive.

3. The method of claim 1, wherein the shared policy comprises maximizing an incentive to the respective individual computer agent.

4. The method of claim 1, wherein the performing of the first or second reinforcement learning calibration comprises applying a reinforcement learning calibration algorithm to historical real-world data in order to reconcile the simulation with the actual real-world data.

5. The method of claim 4, further comprising recording at least one metric that includes a result of the generated simulation,
wherein the performing of the first or second reinforcement learning calibration comprises varying at least one respective type value based on the at least one metric and adjusting the reinforcement learning calibration algorithm based on the varied at least one respective type value.

6. The method of claim 5, further comprising identifying a calibration target that relates to collective actions of the plurality of computer agents and optimizing the reinforcement learning calibration algorithm based on the calibration target.

7. A market-simulation and calibration computing apparatus for performing a simulation, the market-simulation and calibration computing apparatus comprising:
a processor;
a simulation processor;
a display;
a memory; and
a communication interface coupled to each of the processor and the memory, wherein the processor is configured to:
assign, to each respective computer agent from among a plurality of computer agents, a type value that relates to a state of the respective computer agent, such that the plurality of computer agents have differing type values, each of the differing type values indicating a different probability distribution of risk aversion and connectivity to external clients;
receive, via the communication interface and from a plurality of servers over a network, computer agent-specific data for the plurality of computer agents, the plurality of computer agents including computer agents of different types that behave differently, wherein the computer agent-specific data include real-world data that include a market-based observation, a market-based action and a market-based reward;
acquire, from a network database over the network, simulator parameters;
generate via the simulation processor and provide on the display, a simulation based on the assigned type values, the acquired simulator parameters and the received computer agent-specific data for each of the plurality of computer agents being in a different state and by using a shared policy that is shared by all of the plurality of computer agents, wherein the shared policy indicates a probability of a respective individual computer agent action for a corresponding state of the respective individual computer agent, wherein each of the plurality of computer agents use the same shared policy, and wherein each of the plurality of computer agents is restricted to observe only its own state and action to achieve partial observability;
acquire actual real-world data of agent-specific data corresponding to a target locality;
perform first reinforcement learning calibration on the simulation processor that performs the simulation,
wherein the first reinforcement learning calibration is performed using the actual real-world data to constrain a shared equilibria to match a specific real-world target value,
wherein the first reinforcement learning calibration using the actual real-world data specifies a distribution of different computer agent types to correspond to the first constrained shared equilibria,
wherein the distribution of the different computer agent types is reflected on the market simulation and calibration device,
wherein the specific real-world target value for each of the plurality of computer agents is different to collectively satisfy certain constraints,
wherein the first reinforcement learning calibration includes modifying at least one of the type values assigned to the plurality of computer agents based on a result of the simulation until a calibration target is reached, and
wherein the first reinforcement learning calibration is performed by:
inputting learning rates $(\beta_m^{cal})$, $(\beta_m^{shared})$ satisfying a target condition, initial calibrator and shared policies $\pi_0^\Lambda$, $\pi_0$, initial supertype profile $\Lambda_0^b = \Lambda_0$ across episodes $b \in [1, B]$,
while $\pi_m^\Lambda$, $\pi_m$ not converged do, wherein $\pi_m^\Lambda$, $\pi_m$ is a calibrator and shared policies for stage m,
for each episode $b \in [1, B]$ do,
sample supertype increment and set $\delta\Lambda^b \sim \pi_m^\Lambda(\cdot | \Lambda_{m-1}^b)$ and set $\Lambda_m^b := \Lambda_{m-1}^b + \delta\Lambda^b$,
sample multi-agent episode with supertype profile $\Lambda_m^b$ and shared policy $\pi_m$, with $\lambda_i \sim p_{\Lambda_{m-1}^b}$, $\alpha_i^{(i)} \sim \pi_m(\cdot | \cdot, \lambda_i)$, $i \in [1, n]$,
update $\pi_m$ with learning rate $\beta_m^{shared}$ based on gradient of a first equation with the episodes $b \in [1,B]$,
update $\pi_m^\Lambda$ with learning rate $\beta_m^{cal}$ based on gradient to a second equation with episodes $b \in [1,B]$,
the target condition specifies that the learning rates $(\beta_m^{cal})$, $(\beta_m^{shared})$ satisfy $$\frac{\beta_m^{cal}}{\beta_m^{shared}} \xrightarrow{m \to +\infty} 0,$$

as well as Robbins-Monro conditions, that is their respective sum is infinite, and sum of their squares is finite,
the first equation specifies:

$$\nabla_{\theta,\infty}^{VPG} = \nabla_{\theta_1} \hat{V}(\pi_\theta, \pi_\theta), \hat{V}(\pi_1, \pi_2) := \mathbb{E}_{a \sim U[1,n]}[V_{\Lambda_a}(\pi_1, \pi_2)], \pi_1, \pi_2 \in \mathcal{X},$$

wherein the first equation indicates that the shared policy is a Nash equilibrium of the 2-player symmetric game with payoff V, wherein a first player receives $V(\pi_1, \pi_2)$ while the other receives $V(\pi_2, \pi_1)$, and wherein $\partial_1 V(\pi_\theta, \pi_\theta)$ corresponds to trying to improve utility of the first player while keeping the second player fixed, starting from the symmetric point $(\pi_\theta, \pi_\theta)$, and
the second equation specifies:

$$V_{\pi_m}^{calib}(\pi_m^A) := \mathbb{E}_{A \sim \pi_{m-1}^A, A' \sim \pi_m^A(\cdot | A), \lambda_i \sim P_{A_6'}, a_i^{(i)} \sim \pi_m(\cdot | \cdot, \lambda_i)}[r^{cal}],$$

wherein the second equation optimizes an objective of the stage m via a
calibrator's policy $\pi^\Lambda$;
   update the shared policy for the generating of the simulation by the simulation processor based on a result of the first reinforcement learning calibration including the modifying of the at least one of the type values assigned to the plurality of computer agents, wherein the updated shared policy modifies the probability of the respective individual computer agent action for the corresponding state of the respective individual computer agent based on the distribution of the different computer agent types corresponding to the first constrained shared equilibria for at least one of the plurality of computer agents;
   regenerate, via the simulation processor, the simulation using the updated shared policy for obtaining a different output; and
   perform second reinforcement learning calibration on the simulation processor based on the first reinforcement learning calibration to modify the distribution of different computer agent types differently from the distribution of different computer agent types corresponding to the first reinforcement learning calibration, and to second constrain the share equilibria to more accurately constrain the shared equilibria than the first constrain of the shared equilibria in order to more closely match the specific real-world target value corresponding to the target locality, wherein the modified distribution of the different computer agent types are updated on the market simulation and calibration device.

8. The computing apparatus of claim 7, wherein the type value is based on an agent incentive.

9. The computing apparatus of claim 7, wherein the shared policy comprises maximizing an incentive to the respective individual computer agent.

10. The computing apparatus of claim 7, wherein the processor is further configured to perform the first or second reinforcement learning calibration by applying a reinforcement learning calibration algorithm to historical real-world data in order to reconcile the simulation with the actual real-world data.

11. The computing apparatus of claim 10, wherein the processor is further configured to record at least one metric that includes a result of the generated simulation, and to perform the first or second reinforcement learning calibration by varying at least one respective type value based on the at least one metric and adjusting the reinforcement learning calibration algorithm based on the varied at least one respective type value.

12. The computing apparatus of claim 11, wherein the processor is further configured to identify a calibration target that relates to collective actions of the plurality of computer agents and optimize the reinforcement learning calibration algorithm based on the calibration target.

13. A non-transitory computer readable storage medium storing instructions for performing a simulation, the storage medium comprising executable code which, when executed by a processor in a market simulation and calibration device, causes the processor to:
   assign, to each respective computer agent from among a plurality of computer agents, a type value that relates to a state of the respective computer agent, such that the plurality of computer agents have differing type values, each of the differing type values indicating a probability distribution of risk aversion and connectivity to external clients;
   receive, from a plurality of servers over a network, computer agent-specific data for the plurality of computer agents, the plurality of computer agents including computer agents of different types that behave differently, wherein the computer agent-specific data include real-world data that include a market-based observation, a market-based action and a market-based reward;
   acquire, from a network database over the network, simulator parameters;
   generate, via a simulation processor of the market simulation and calibration device and provide on a display of the market simulation and calibration device, a simulation based on the assigned type values, the acquired simulator parameters and the received computer agent-specific data for each of the plurality of computer agents being in a different state and by using a shared policy that is shared by all of the plurality of computer agents, wherein the shared policy indicates a probability of a respective individual computer agent action for a corresponding state of the respective individual computer agent, wherein each of the plurality of computer agents use the same shared policy, and wherein each of the plurality of computer agents is restricted to observe only its own state and action to achieve partial observability;
   acquire actual real-world data of agent-specific data corresponding to a target locality;
   perform first reinforcement learning calibration on the simulation processor that performs the simulation,
   wherein the first reinforcement learning calibration is performed using the actual real-world data to constrain a shared equilibria to match a specific real-world target value,
   wherein the first reinforcement learning calibration using the actual real-world data specifies a distribution of different computer agent types to correspond to the first constrained shared equilibria,
   wherein the distribution of the different computer agent types is reflected on the market simulation and calibration device,
   wherein the specific real-world target value for each of the plurality of computer agents is different to collectively satisfy certain constraints,
   wherein the first reinforcement learning calibration includes modifying at least one of the type values assigned to the plurality of computer agents based on a result of the simulation until a calibration target is reached, and
   wherein the first reinforcement learning calibration is performed by:
      inputting learning rates $(\beta_m^{cal})$, $(\beta_m^{shared})$ satisfying a target condition, initial calibrator and shared policies $\pi_0^\Lambda$, $\pi_0$, initial supertype profile $\Lambda_0^b = \Lambda_0$ across episodes $b \in [1,B]$,
      while $\pi_m^\Lambda$, $\pi_m$ not converged do, wherein $\pi_m^\Lambda$, $\pi_m$ is a calibrator and shared policies for stage m,
      for each episode $b \in [1, B]$ do,
      sample supertype increment and set $\delta\Lambda^b \sim \pi_m^\Lambda(\cdot | \Lambda_{m-1}^b)$ and set $\Lambda_m^b := \Lambda_{m-1}^b + \delta\Lambda^b$,
      sample multi-agent episode with supertype profile $\Lambda_m^b$ and shared policy $\pi_m$, with $\lambda_i \sim p_{\Lambda_{m-1}^b}$, $\alpha_t^{(i)} \sim \pi_m(\cdot | \cdot, \lambda_i)$, $i \in [1, n]$,
      update $\pi_m$ with learning rate $\beta_m^{shared}$ based on gradient of a first equation with the episodes $b \in [1,B]$, update $\pi_m^A$ with learning rate $\beta_m^{cal}$ based on gradient to a second equation with episodes b∈[1,B], the target condition specifies that the learning rates $(\beta_m^{cal})$, $(\beta_m^{shared})$ satisfy $$\frac{\beta_m^{cal}}{\beta_m^{shared}} \xrightarrow{m\to+\infty} 0,$$

as well as Robbins-Monro conditions, that is their respective sum is infinite, and sum of their squares is finite, the first equation specifies:

$$\nabla_{\theta,\infty}^{VPG} = \nabla_{\theta_1} \hat{V}(\pi_\theta, \pi_\theta), \hat{V}(\pi_1, \pi_2) := \mathbb{E}_{a\sim U[1,n]}[V_{\Lambda_a}(\pi_1, \pi_2)], \pi_1, \pi_2 \in \mathcal{X},$$

wherein the first equation indicates that the shared policy is a Nash equilibrium of the 2-player symmetric game with payoff V, wherein a first player receives V ($\pi_1$, $\pi_2$) while the other receives V ($\pi_2$, $\pi_1$), and wherein $_{\theta_1}$V ($\pi_\theta$, $\pi_\theta$) corresponds to trying to improve utility of the first player while keeping the second player fixed, starting from the symmetric point ($\pi_\theta$, $\pi_\theta$), and the second equation specifies:

$$V_{\pi_m}^{calib}(\pi_m^A) := \mathbb{E}_{A\sim\tilde{\pi}_{m-1}^A, A'\sim\pi_m^A(\cdot|A)+A,\lambda_i\sim P_{A_6'},a_i^{(i)}\sim\pi_m(\cdot|\cdot,\lambda_i)}[r^{cal}],$$

wherein the second equation optimizes an objective of the stage m via a calibrator's policy $\pi^A$;

update the shared policy for the generating of the simulation via the simulation processor based on a result of the first reinforcement learning calibration including the modifying of the at least one of the type values assigned to the plurality of computer agents, wherein the updated shared policy modifies the probability of the respective individual computer agent action for the corresponding state of the respective individual computer agent based on the distribution of the different computer agent types corresponding to the first constrained shared equilibria for at least one of the plurality of computer agents;

regenerate, via the simulation processor, the simulation using the updated shared policy for obtaining a different output; and perform second reinforcement learning calibration on the simulation processor based on the first reinforcement learning calibration to modify the distribution of different computer agent types differently from the distribution of different computer agent types corresponding to the first reinforcement learning calibration, and to second constrain the share equilibria to more accurately constrain the shared equilibria than the first constrain of the shared equilibria in order to more closely match the specific real-world target value corresponding to the target locality, wherein the modified distribution of the different computer agent types are updated on the market simulation and calibration device.

14. The non-transitory computer readable storage medium of claim 13, wherein the type value is based on an agent incentive.

15. The non-transitory computer readable storage medium of claim 13, wherein the executable code is further configured to cause the processor to perform the first or second reinforcement learning calibration by applying a reinforcement learning calibration algorithm to historical real-world data in order to reconcile the simulation with the actual real-world data.

* * * * *